United States Patent
Bibler et al.

(10) Patent No.: US 12,515,724 B2
(45) Date of Patent: Jan. 6, 2026

(54) UTILITY CART

(71) Applicant: WERNER CO., West Middlesex, PA (US)

(72) Inventors: Derek E. Bibler, Charlotte, NC (US); Mohammed Irfan, Concord, NC (US); Robert Grant McRorie, III, Huntersville, NC (US); Sang Oh, Lake Zurich, IL (US)

(73) Assignee: Werner Co., West Middlesex, PA (US)

( * ) Notice: Subject to any disclaimer, the term of this patent is extended or adjusted under 35 U.S.C. 154(b) by 350 days.

(21) Appl. No.: 18/309,975

(22) Filed: May 1, 2023

(65) Prior Publication Data

US 2023/0347954 A1 Nov. 2, 2023

Related U.S. Application Data

(60) Provisional application No. 63/392,573, filed on Jul. 27, 2022, provisional application No. 63/337,299, filed on May 2, 2022.

(51) Int. Cl.
*F16B 12/02* (2006.01)
*A47B 47/03* (2006.01)
(Continued)

(52) U.S. Cl.
CPC .............. *B62B 3/003* (2013.01); *B62B 3/004* (2013.01); *B62B 5/06* (2013.01); *F16B 12/02* (2013.01);
(Continued)

(58) Field of Classification Search
CPC . B62B 3/02; F16B 12/02; A47B 47/03; A47B 47/05
See application file for complete search history.

(56) References Cited

U.S. PATENT DOCUMENTS 4,045,104 A * 8/1977 Peterson ................ A47B 47/03
312/263
4,426,935 A * 1/1984 Nikoden, Jr. .......... A47B 47/03
312/265.5
(Continued)

FOREIGN PATENT DOCUMENTS

DE 202005020506 U1 * 2/2006 ............. A47B 31/00

OTHER PUBLICATIONS

International Search Report and Written Opinion for Int. App. No. PCT/US2023/066426, mailed Jul. 26, 2023.

*Primary Examiner* — Emma K Frick
(74) *Attorney, Agent, or Firm* — Michael Best & Friedrich LLP

(57) ABSTRACT

A utility cart includes a base having a first side, a second side, a third side, and a fourth side, and a first channel extending along each of the first side, the second side, the third side and the fourth side. A first, second, third, and fourth support post extends upwardly from the base between respective sides of the base. Each of the support posts has a first end and a second end. A tray is attached to the second end of each of the support posts, and the tray comprises a second channel opening downwards from the tray. A first side panel is positioned between the base, the tray, the first support post, and the second support post. The utility cart further includes a cart handle coupled to the tray and a plurality of wheels secured to a bottom of the base.

20 Claims, 15 Drawing Sheets

(51) Int. Cl.
  *B62B 3/00*   (2006.01)
  *B62B 3/02*   (2006.01)
  *B62B 5/06*   (2006.01)

(52) U.S. Cl.
  CPC ............... *A47B 47/03* (2013.01); *B62B 3/02* (2013.01); *B62B 2206/06* (2013.01); *B62B 2301/044* (2013.01); *B62B 2501/00* (2013.01)

(56) References Cited

U.S. PATENT DOCUMENTS

| | | | | |
|---|---|---|---|---|
| 4,786,122 | A * | 11/1988 | Nichoalds | A47B 47/05 312/249.8 |
| 5,069,466 | A * | 12/1991 | Propst | A47B 31/00 211/186 |
| 5,221,131 | A * | 6/1993 | Lesperance | A47B 47/025 312/265.3 |
| 5,915,803 | A * | 6/1999 | Daugherty | A47B 67/04 312/265.5 |
| 5,975,660 | A * | 11/1999 | Tisbo | A47B 47/045 312/265.2 |
| 6,053,591 | A * | 4/2000 | Kasanic | A47B 47/0075 52/79.5 |
| 6,202,867 | B1 * | 3/2001 | Di Blasi | A47B 87/008 108/138 |
| 6,550,880 | B2 * | 4/2003 | Reuter | A47B 47/05 312/265.3 |
| 6,981,751 | B2 * | 1/2006 | Powell | A47B 47/05 312/265.3 |
| 8,403,431 | B2 * | 3/2013 | Elkins | H04Q 1/11 312/265.3 |
| 9,079,596 | B2 * | 7/2015 | Sofy | B62B 3/003 |
| 9,272,722 | B2 * | 3/2016 | Dufoure | B62B 3/002 |
| 9,986,823 | B2 * | 6/2018 | Winter | A47B 69/00 |
| 10,029,718 | B2 * | 7/2018 | Benning | B62B 3/003 |
| 10,113,571 | B2 * | 10/2018 | Kubiniec | E04H 9/00 |
| 10,486,723 | B2 * | 11/2019 | Liao | B62B 3/003 |
| 10,881,199 | B1 * | 1/2021 | Le | A47B 88/402 |
| 10,960,910 | B1 * | 3/2021 | Garcia | B62B 3/02 |
| 11,420,664 | B2 * | 8/2022 | Liao | A47B 31/00 |
| 11,647,832 | B2 * | 5/2023 | Sheikhi | A47B 47/0083 312/257.1 |
| 2003/0227150 | A1 * | 12/2003 | van Hekken | B62B 3/006 280/79.3 |
| 2005/0077805 | A1 * | 4/2005 | Dalebout | A47B 47/0083 312/249.11 |

* cited by examiner

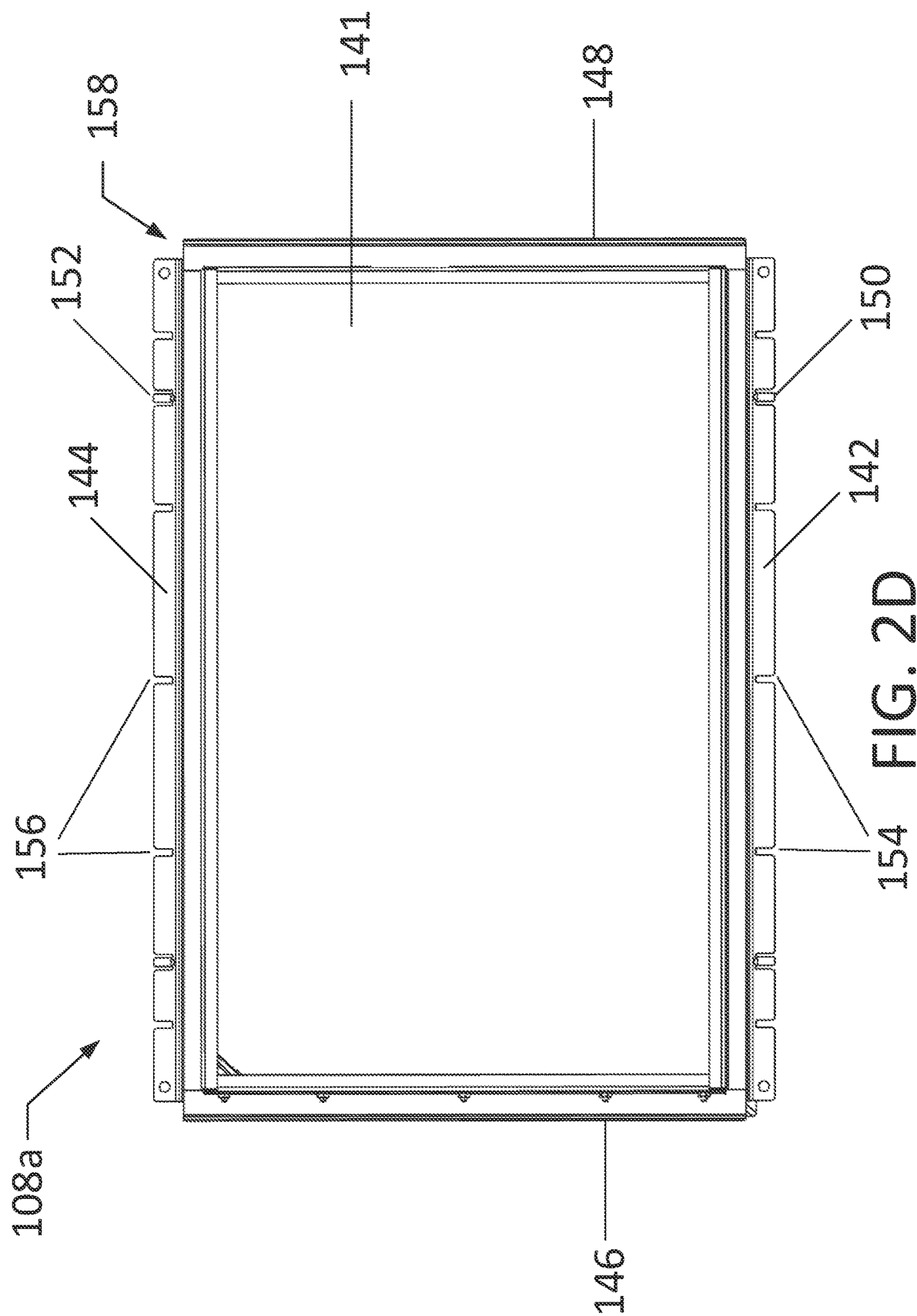

UTILITY CART

CROSS-REFERENCE TO RELATED APPLICATIONS

The present application claims priority to provisional U.S. Application No. 63/337,299 filed May 2, 2022 and provisional U.S. Application No. 63/392,573 filed Jul. 27, 2022, the contents of each of which are hereby incorporated by reference in their entirety.

BACKGROUND

A. Field

This disclosure relates generally to a utility cart having multiple configurations, and more particularly to a utility cart that may provide increased flexibility and convenience for a user on a jobsite by being able to easily transport and access tools and other construction supplies at the user's work station.

B. Description of Related Art

Jobsite boxes are generally used at construction job sites and similar locations for storing tools and materials. Workers typically have to move back and forth from their active work area to the jobsite box in order to exchange necessary tools, review and/or draw plans, or access additional materials. This back and forth process can be inconvenient, time consuming, and frustrating.

SUMMARY

The following embodiments and aspects thereof are described and illustrated in conjunction with systems, tools and methods which are meant to be exemplary and illustrative, not limiting in scope.

In one aspect, a utility cart is disclosed. The utility cart includes a base having a first side, a second side, a third side, and a fourth side, and a first channel extending along each of the first side, the second side, the third side and the fourth side. A first support post extends upwardly from the base between the fourth side and the first side, a second support post extends upwardly from the base between the first side and the second side, a third support post extends upwardly from the base between the second side and the third side, and a fourth support post extends upwardly from the base between the third side and the fourth side. Each of the first, second, third, and fourth support posts have a first end and a second end. A tray is attached to the second end of each of the support posts, and the tray comprises a second channel opening downwards from the tray. A first side panel is positioned between the base, the tray, the first support post, and the second support post. The first side panel includes a first flange positioned on a lower portion of the first side panel that is configured to be press-fit into the first channel of the base and a second flange positioned on an upper portion of the first side panel that is configured to be press-fit into the second channel of the tray. The first side panel includes a first arm positioned on a first side of the first side panel to be inserted into a first sleeve extending along a first length of the first support post and a second arm positioned on a second side of the first side panel to be inserted into a second sleeve extending along a second length of the second support post. The utility cart further includes a cart handle coupled to the tray and a plurality of wheels secured to a bottom of the base.

In another aspect, a utility cart is disclosed. The utility cart includes a base having a first side, a second side, a third side, and a fourth side, and a first channel extending along each of the first side, the second side, the third side and the fourth side. A first support post extends upwardly from the base between the fourth side and the first side, a second support post extends upwardly from the base between the first side and the second side, a third support post extends upwardly from the base between the second side and the third side, and a fourth support post extends upwardly from the base between the third side and the fourth side. Each of the first, second, third, and fourth support posts have a first end and a second end. A tray is attached to the second end of each of the support posts, and the tray comprises a second channel opening downwards from the tray. A first side panel is positioned between the base, the tray, the first support post, and the second support post. The first side panel includes a first flange on a lower portion of the first side panel configured to be coupled with the first channel of the base and a second flange on an upper portion of the first side panel configured to be coupled with the second channel of the tray such that the first flange includes a first anti-vibration tab configured to bias the first side panel against a first wedge of an inner edge of the first channel and the second flange includes a second anti-vibration tab configured to bias the first side panel against a second wedge of an inner edge of the second channel. The utility cart further includes a cart handle coupled to the tray and a plurality of wheels secured to a bottom of the base.

In another aspect, a utility cart is disclosed. The utility cart includes a base having a first side, a second side, a third side, and a fourth side, and a first channel extending along each of the first side, the second side, the third side and the fourth side. A first support post extends upwardly from the base between the fourth side and the first side, a second support post extends upwardly from the base between the first side and the second side, a third support post extends upwardly from the base between the second side and the third side, and a fourth support post extends upwardly from the base between the third side and the fourth side. Each of the first, second, third, and fourth support posts have a first end and a second end. A tray is attached to the second end of each of the support posts, and the tray comprises a second channel opening downwards from the tray. A first side panel is positioned between the base, the tray, the first support post, and the second support post. The first side panel includes a first flange on a lower portion of the first side panel configured to be coupled with the first channel of the base and a second flange on an upper portion of the first side panel configured to be coupled with the second channel of the tray such that the first flange includes a first plurality of notches such that the first plurality of notches are configured to align with a first plurality of ribs in the first channel of the base and the second flange includes a second plurality of notches such that the second plurality of notches are configured to align with a second plurality of ribs in the second channel of the tray. The utility cart further includes a cart handle coupled to the tray and a plurality of wheels secured to a bottom of the base.

In addition to the exemplary aspects and embodiments described above, further aspects and embodiments will become apparent by reference to the drawings and by study of the following detailed description.

BRIEF DESCRIPTION OF THE FIGURES

Exemplary embodiments are illustrated in the drawings. It is intended that the embodiments and figures disclosed herein are to be considered illustrative rather than restrictive.

FIG. 2D depicts an example of an example utility cart, in accordance with an embodiment;

DETAILED DESCRIPTION

Disclosed is a utility cart that provides increased flexibility and convenience for a user on a jobsite by being able to easily transport and access tools and other construction supplies at the user's work station. The utility cart may be an enclosed structure on wheels with a tray on top such that a worker's tools may be stored inside the structure and/or on top of the tray, and such that the worker may be able to transport their required tools from one area of a jobsite to the next while on the job without having to return to a single location for all of the tools (i.e. with a standard, non-mobile jobsite box). Further, the utility cart may also be customized to include unique features for a variety of jobsite needs.

Figure 1A:
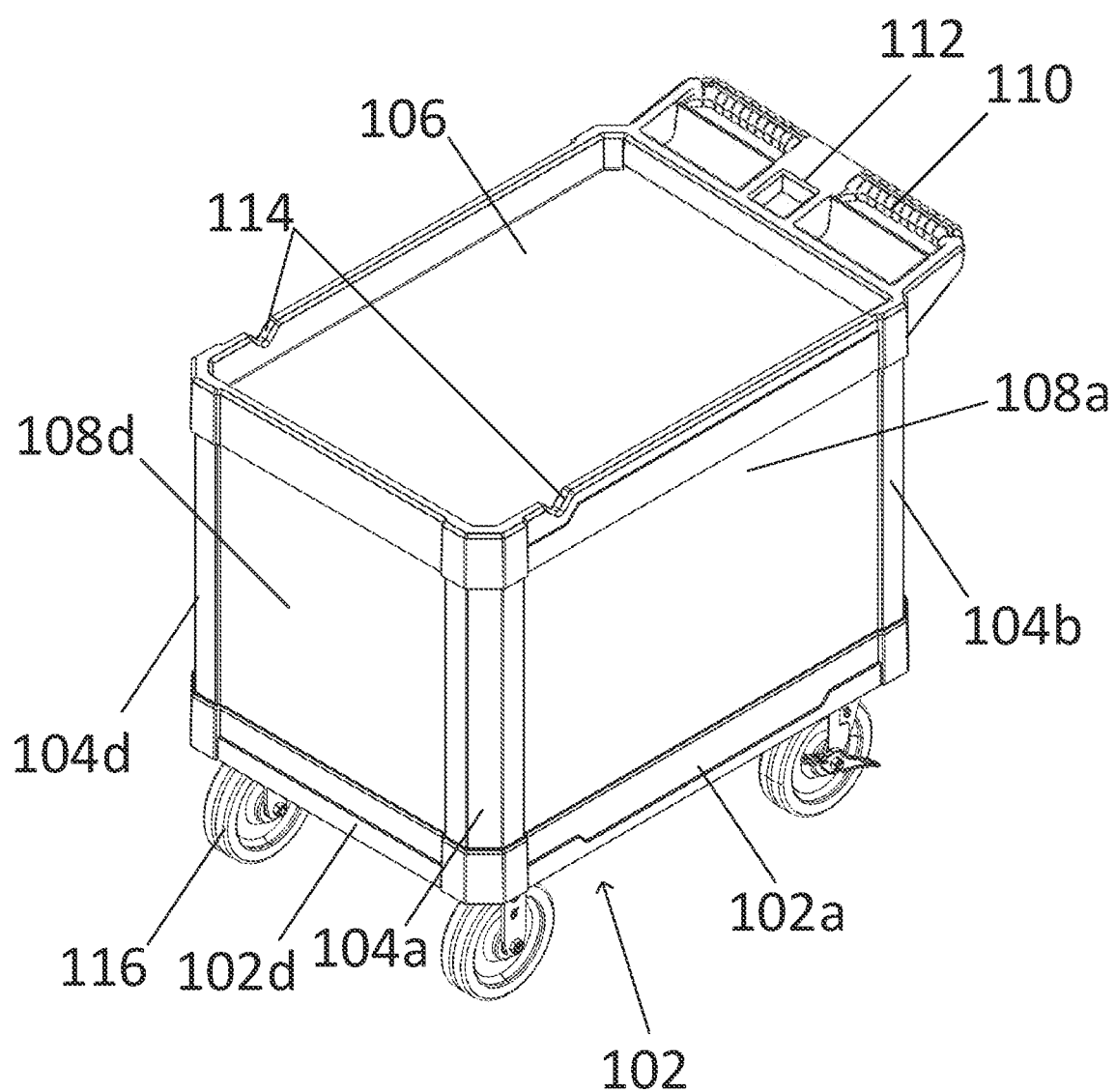
FIG. 1A is a top perspective view of an example utility cart, in accordance with an embodiment.
Figure 1B:
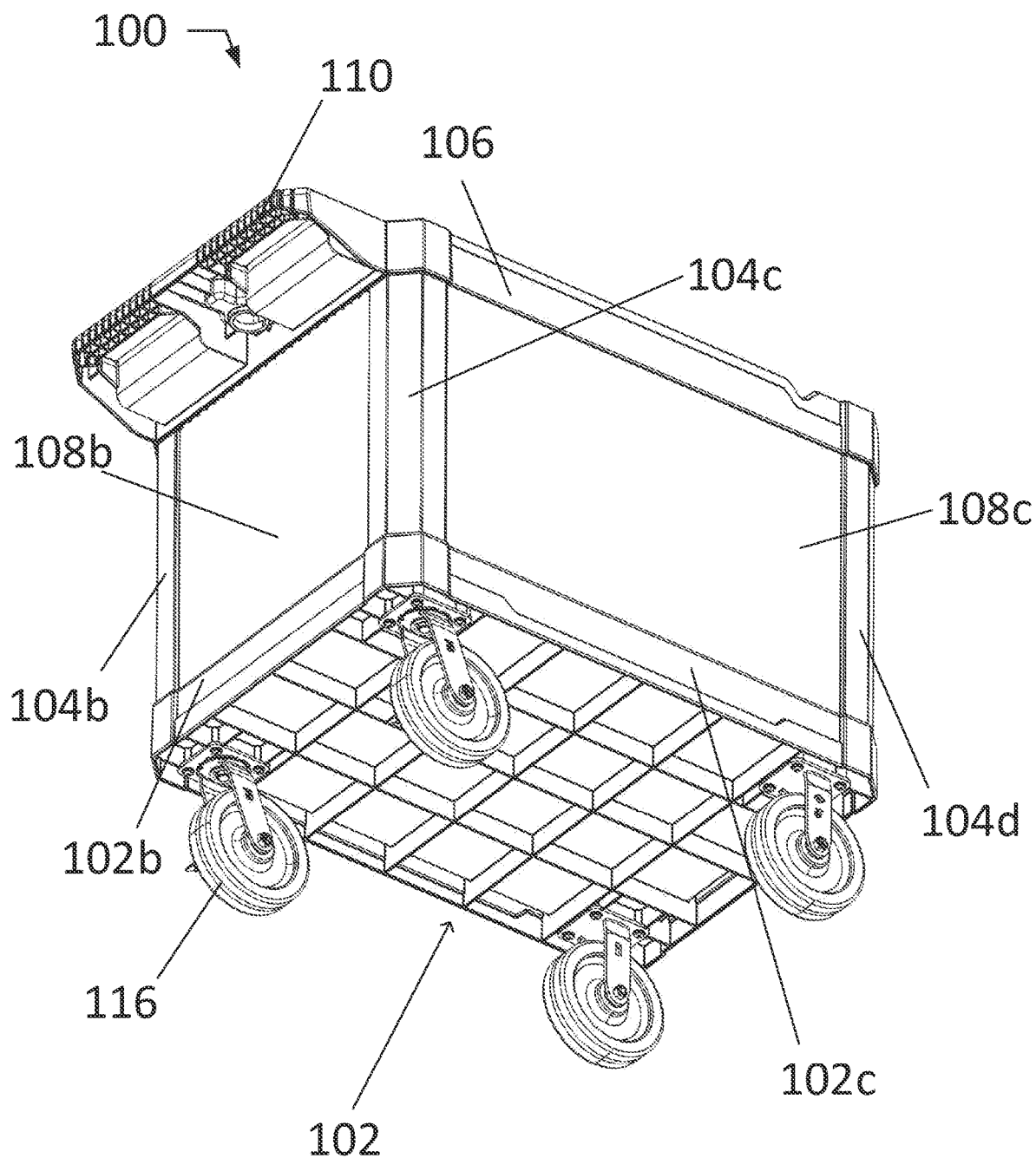
FIG. 1B is a bottom perspective view of the example utility cart in FIG. 1A, in accordance with an embodiment.
Figure 2A:
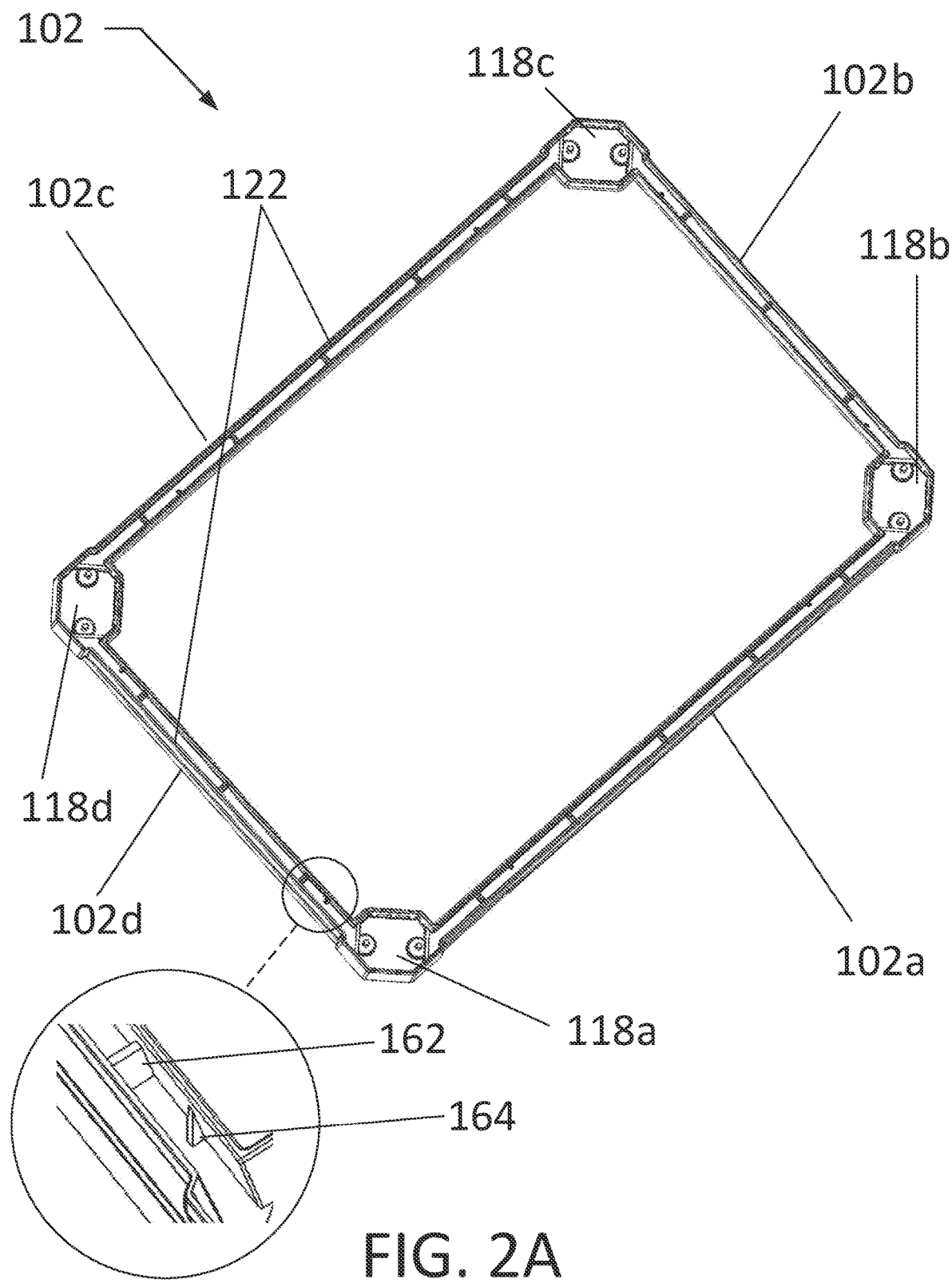
FIG. 2A is a perspective view of a base of an example utility cart, in accordance with an embodiment.

FIG. 1 depicts an example utility cart 100 and FIGS. 2A-2E depict components of the example utility cart 100. The utility cart 100 includes a base 102 having a first side 102a, a second side 102b, a third side 102c, a fourth side 102d, and a first channel 122 extending along each of the first side 102a, the second side 102b, the third side 102c, and the fourth side 102d, as is shown in FIG. 2A. In some embodiments, the first channel 122 of the base 102 is a u-shaped channel having an inner edge 122b, a lower edge 122c, and an outer edge 122a (shown in FIGS. 4A-4B).

The base 102 further includes a first mounting location 118a, a second mounting location 118b, a third mounting location 118c, and a fourth mounting location 118d such that each mounting location is configured to receive a further component of the utility cart 100. For instance, in some embodiments, a first support post 104a extends upwardly from the base 102 at the first mounting location 118a between the fourth side 102d of the base 102 and the first side 102a of the base 102. A second support post 104b extends upwardly from the base 102 at the second mounting location 118b between the first side 102a of the base 102 and the second side 102b of the base 102. A third support post 104c extends upwardly from the base 102 at the third mounting location 118c between the second side 102b of the base 102 and the third side 102c of the base 102. Further, a fourth support post 104d extends upwardly from the base 102 at the fourth mounting location 118d between the third side 102c of the base 102 and the fourth side 102d of the base 102. Each of the support posts 104a, 104b, 104c, and 104d has a first end 103a, 103b, 103c, and 103d, respectively, used to couple at the base 102 and a second end 105a, 105b, 105c, and 105d, respectively, that is extended upwardly, as is shown in FIG. 2C.

The first channel 122 along the base 102 of the utility cart 100 further includes a first plurality of ribs 162 configured to couple with a first plurality of notches 154 along a length of a lower flange of a side panel. In some embodiments, the first channel 122 also includes two wedges 164 on each side of the base 102 extending from an inner edge of the first channel 122. Other positions and numbers of wedges are also possible.

Figure 2B:
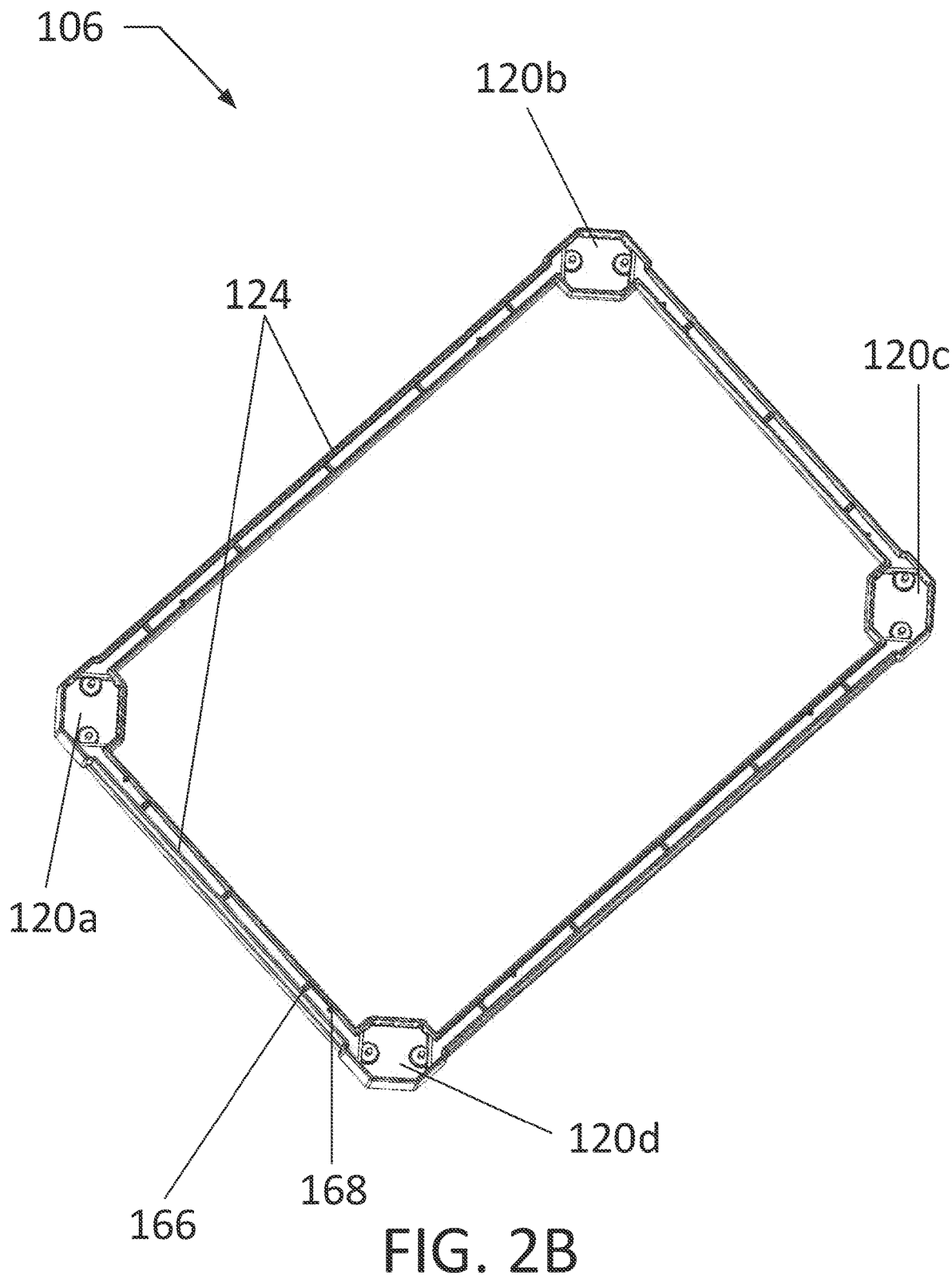
FIG. 2B is a perspective view of an underside of a tray of an example utility cart, in accordance with an embodiment.
Figure 2C:
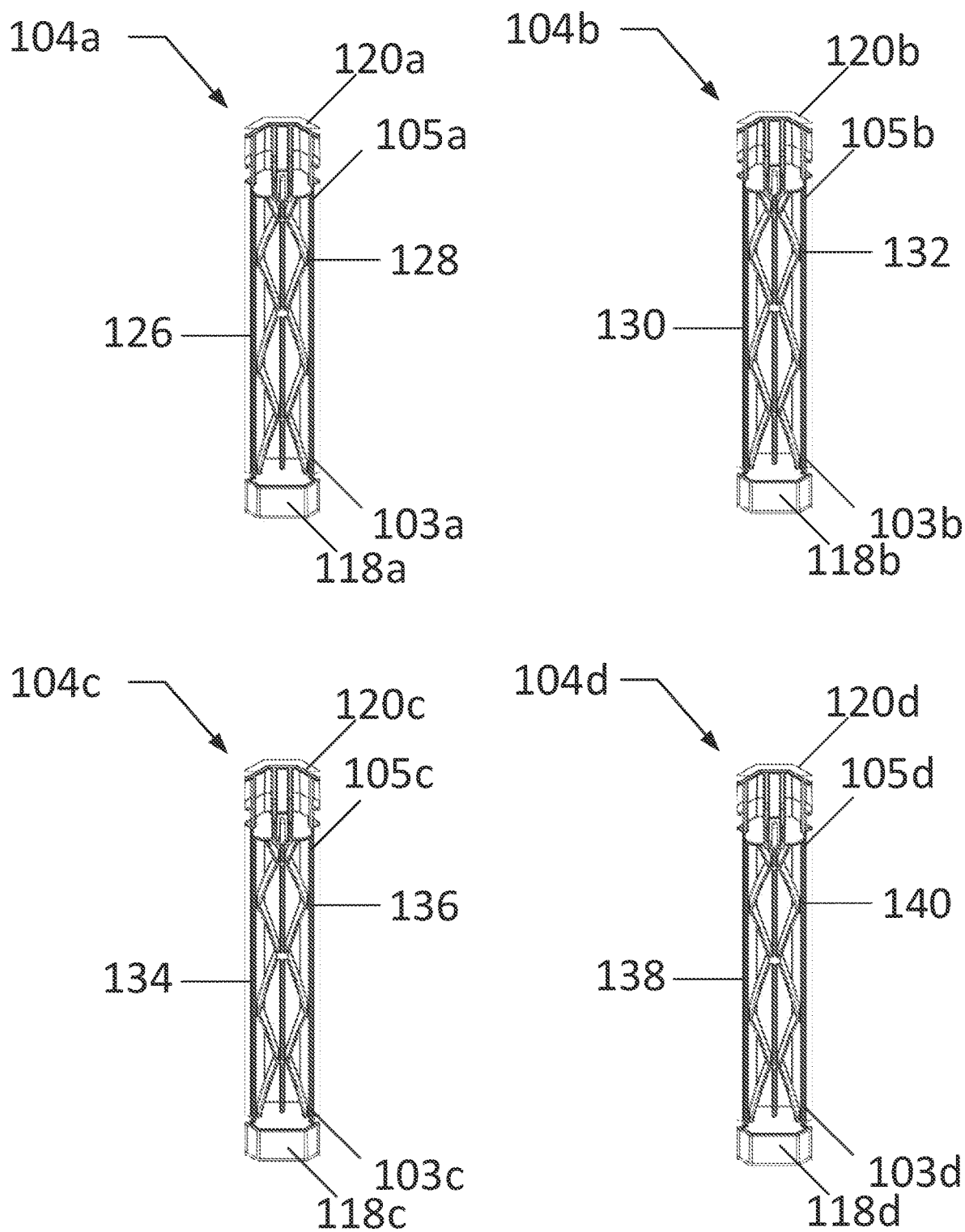
FIG. 2C depicts an interior of a plurality of support posts of an example utility cart, in accordance with various embodiments.

The utility cart 100 further includes a tray 106, an underside of which is depicted in FIG. 2B. The tray 106 includes a first mounting location 120a, a second mounting location 120b, a third mounting location 120c, and a fourth mounting location 120d such that each mounting location is configured to receive a further component of the utility cart 100. The tray 106 also includes a second channel 124 opening downwards and extending around a perimeter of an underside of the tray 106. The second channel 124 of the tray 106 may be an upside down u-shaped channel on an underside of the tray having an inner edge, an upper edge, and an outer edge, similar to the first channel 122 on the base 102.

The first mounting location 120a is configured to receive the second end 105a of the first support post 104a, the second mounting location 120b is configured to receive the second end 105b of the second support post 104b, the third mounting location 102c is configured to receive the second end 105c of the third support post 104c, and the fourth mounting location 120d is configured to receive the second end 105d of the fourth support post 104d. In this configuration, the tray 106 is mounted above the base 102 with the first support post 104a, the second support post 104b, the third support post 104c, and the fourth support post 104d extending therebetween.

The second channel 124 along the tray 106 of the utility cart 100 further includes a second plurality of ribs 166 configured to couple with a second plurality of notches 156 along a length of an upper flange of a side panel. In some embodiments, the second channel 124 also includes two wedges 168 on each side of the tray 106 extending from an inner edge of the second channel 124. Other positions and numbers of wedges are also possible.

Further, some embodiments include, as shown in FIG. 2C, an interior of the first support post 104a extending from the first end 103a at the first mounting location 118a on the base 102 to the second end 105a at the first mounting location 120a on the underside of the tray 106, an interior of the second support post 104b extending from the first end 103b at the first mounting location 118b on the base 102 to the second end 105b at the second mounting location 120b on the underside of the tray 106, an interior of the third support post 104c extending from the first end 103c at the first mounting location 118c on the base 102 to the second end 105c at the third mounting location 120c on the underside of the tray 106, and an interior of the fourth support post 104d extending from the first end 103d at the first mounting location 118d on the base 102 to the second end 105d at the fourth mounting location 120d on the underside of the tray 106. In some embodiments, the first support post 104a includes a first sleeve 126 extending along a first length of the first support post 104a and a second sleeve 128 extending along a second length opposite the first length of the first support post 104a. The second support post 104b includes a first sleeve 130 extending along a first length of the second support post 104b and a second sleeve 132 extending along a second length opposite the first length of the second support post 104b. The third support post 104c includes a first sleeve 134 extending along a first length of the third support post 104c and a second sleeve 136 extending along a second length opposite the first length of the third support post 104c. The fourth support post 104d includes a first sleeve 138 extending along a first length of the fourth support post 104d and a second sleeve 140 extending along a second length opposite the first length of the fourth support post 104d.

A first side panel 108a may be positioned between the base 102, the tray 106, the first support post 104a, and the second support post 104b. In some embodiments, the first side panel 108a includes a first flange, lower flange 142, positioned on a lower portion of the first side panel 108a, as shown in FIG. 2D, extending at least partially beneath a wall portion 141 of the first side panel 108a. The lower flange 142 is configured to be press-fit into a portion of the first channel 122 of the base 102 between the first mounting location 118a and the second mounting location 118b, along the first side 102a of the base 102. In some embodiments, the first side panel 108a further includes a second flange, upper flange 144, positioned on an upper portion of the first side panel 108a, as is shown in FIG. 2D, extending at least partially above the wall portion 141 of the first side panel 108a. The upper flange 144 is configured to be press-fit into a portion of the second channel 124 of the tray 106 between the first mounting location 120a and the second mounting location 120b. In some embodiments, the lower flange 142 and the upper flange 144 each extend into a second plane that is different from the plane of the wall portion 141 of the first side panel 108a such that the second plane is substantially parallel with the plane of the wall portion 141 of the first side panel 108a. In some embodiments, the plane of the wall portion 141 of the first side panel 108a is separated from the second plane by a distance d. In some embodiments, the distance d may be in the range of about 0.419 inches to about 0.481 inches. However, it should be understood in other embodiments that the distance d may be larger or smaller.

Further, in some embodiments, the lower flange 142 is separated from the wall portion 141 of the first side panel 108a by a bend in the material, such as a first s-shaped bend. Similarly, in some embodiments, the upper flange 144 is separated from the wall portion 141 of the first side panel 108a by a bend in the material, such as a second s-shaped bend.

Figure 2E:
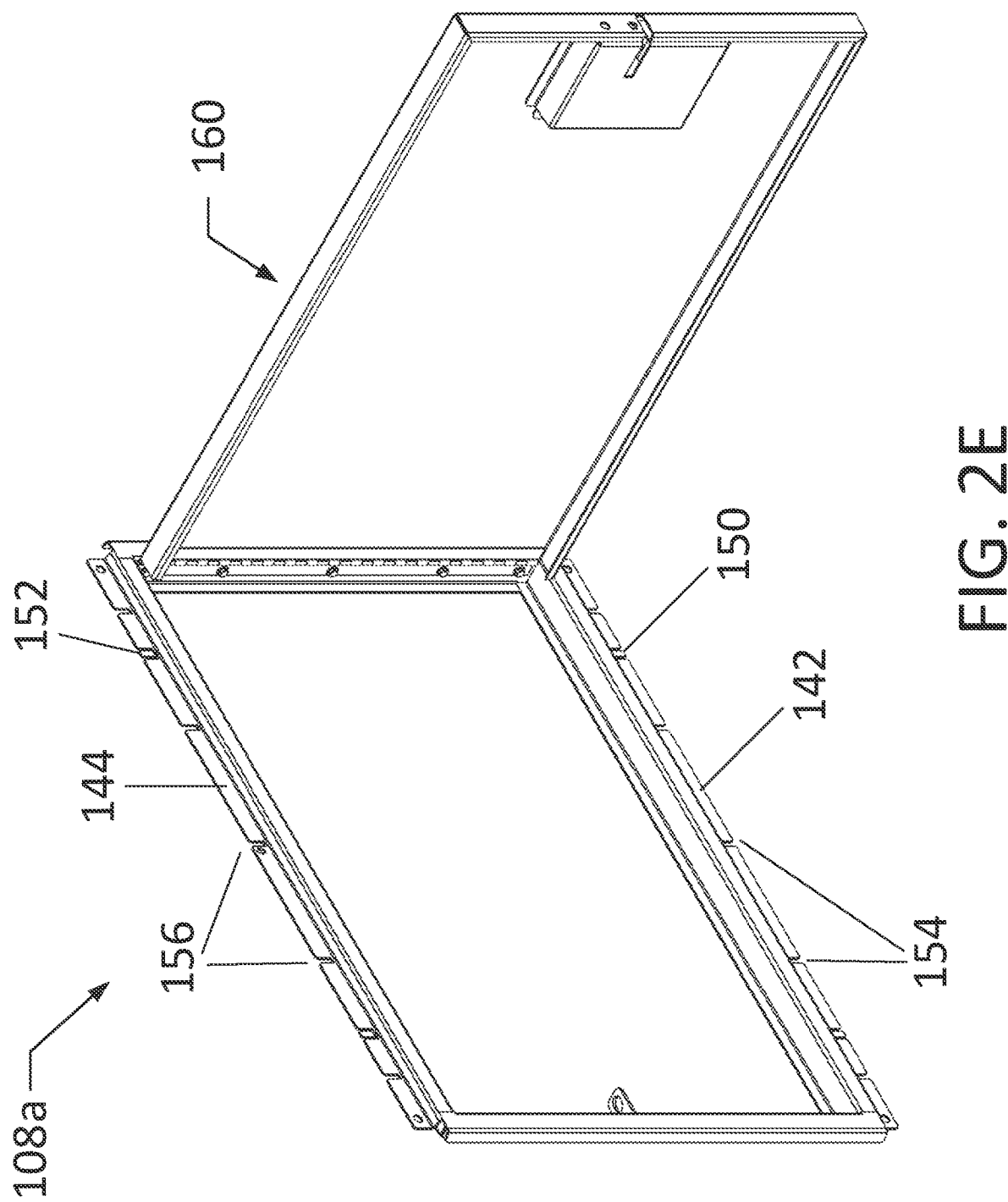
FIG. 2E depicts an example panel of an example utility cart having an at least one door, in accordance with an embodiment.

Further, in some embodiments, as shown in FIG. 2D-2E, the first side panel 108a includes a first arm 146 configured to be inserted into the first sleeve 126 of the first support post 104a extending along the first length of the first support post 104a, and the first side panel 108a includes a second arm 148a configured to be inserted into the second sleeve 132 of the second support post 104b extending along the second length of the second support post 104b. The side panels may be attached to the support posts by a number of different fastening mechanisms, which are shown in FIGS. 3A-3D and are described in detail below. As such, the first side panel 108a extends between the first support post 104a and the second support post 104b. The first side panel 108a further includes a lower flange 142 of the first side panel 108a configured to be press fit into a channel in a base of an example utility cart.

In some embodiments, the lower flange 142 also includes an at least one anti-vibration tab 150 configured to bias the first side panel 108a against one wedge 164 extending from the inner edge of the first channel 122 in the base 102 of the example utility cart 100. In some embodiments, the upper flange 144 also includes an at least one anti-vibration tab 152 configured to bias the first side panel 108a against one wedge 168 extending from the inner edge of the second channel 124 in the underside of the tray 106 of the utility cart 100. The positioning and interaction of the anti-vibration tabs and wedges are shown in detail in FIGS. 4A and 4B and described below.

In some embodiments, the first channel 122 in the base 102 of the utility cart 100 further includes the first plurality of ribs 162 configured to couple with a first plurality of notches 154 along a length of the lower flange 142 of the first side panel 108a. In some embodiments, the second channel 124 in the underside of the tray 106 of the utility cart 100 further includes the second plurality of ribs 166 configured to couple with a second plurality of notches 156 along a length of the upper flange 142 of the first side panel 108a. The positioning and interaction of the ribs and notches are shown in detail in FIGS. 4A and 4B and described below.

The first side panel 108a may further take any of a number of forms, such as, for example, a solid panel, a vented sheet, an openable panel, or the like. In some embodiments of the utility cart, each side panel may further comprise a shoulder 158 in each corner such that each side panel is configured to be installed in a plurality of orientations. As such, each side panel may be configured to be installed and functional in more than one alignment, making manufacturing of the utility cart easier. However, in other embodiments, the installation of each side panel may not be interchangeable, such as when there is a desired additional feature in the side panel that requires a specific orientation. For example, in some embodiments, a side panel on an example utility cart further includes one or more doors, such as the door 160 shown in FIG. 2E. In such a scenario, the side panel should be installed such that the at least one door is functional and allows a user access to an interior of the utility cart, i.e. for further storage. In some embodiments, the side panel includes a singular door. However, in other embodiments, two doors are included in the side panel such that the doors open from a center of the side panel outward. Other configurations are possible. In some embodiments, the at least one door further includes a locking mechanism. The locking mechanism could be an indentation configured to receive a locking device, such as a padlock. In some embodiments, the indentation could further include an aperture in a bottom portion of the indentation configured to receive a loop of a padlock when the padlock is not being used to lock the door to the remainder of the side panel.

Figure 6A:
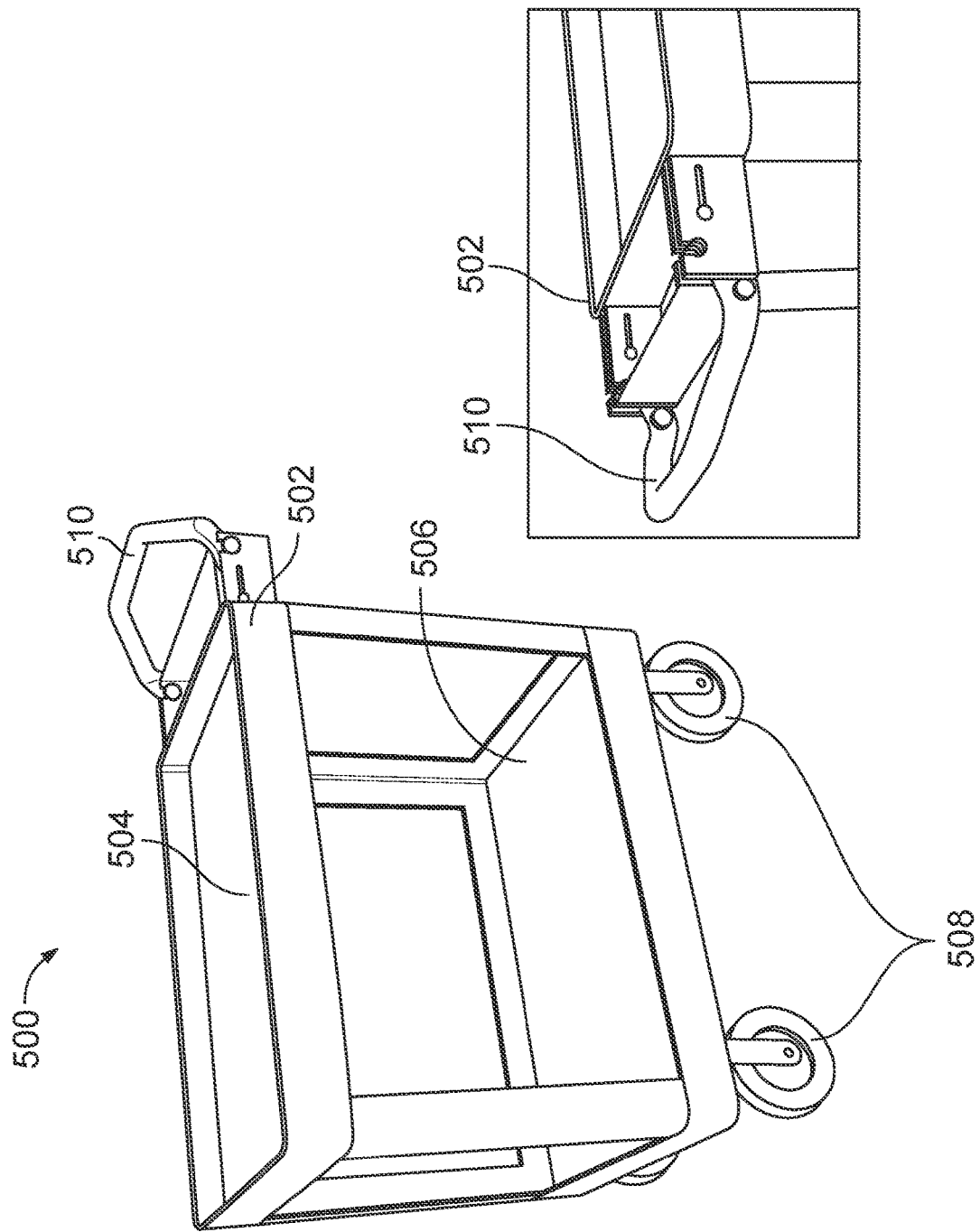
FIG. 6A depicts an example utility cart handle, in accordance with another embodiment.
Figure 6B:
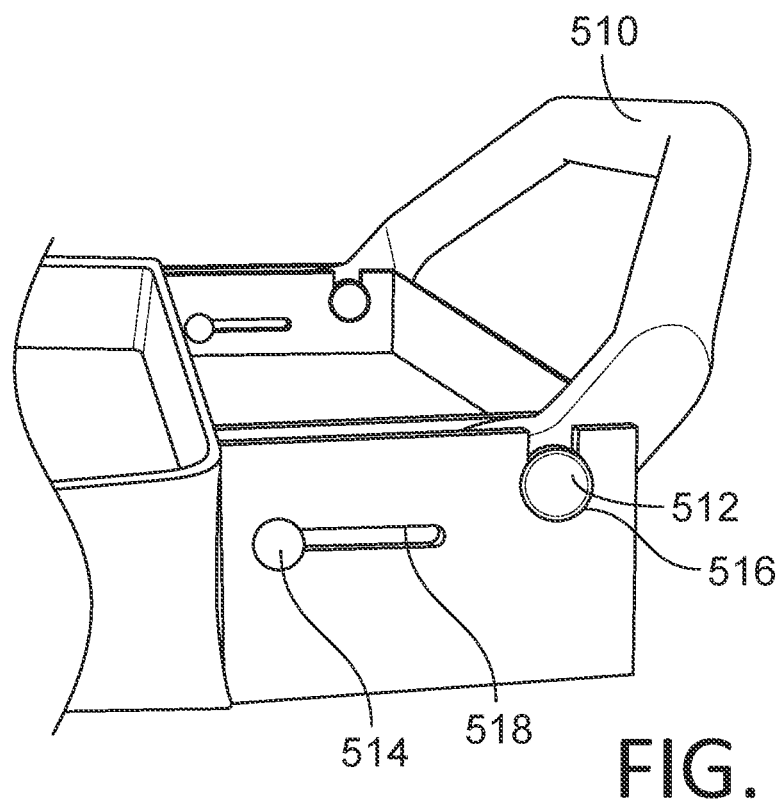
FIG. 6B depicts components of the example utility cart handle of FIG. 6A, in accordance with an embodiment.
Figure 6C:
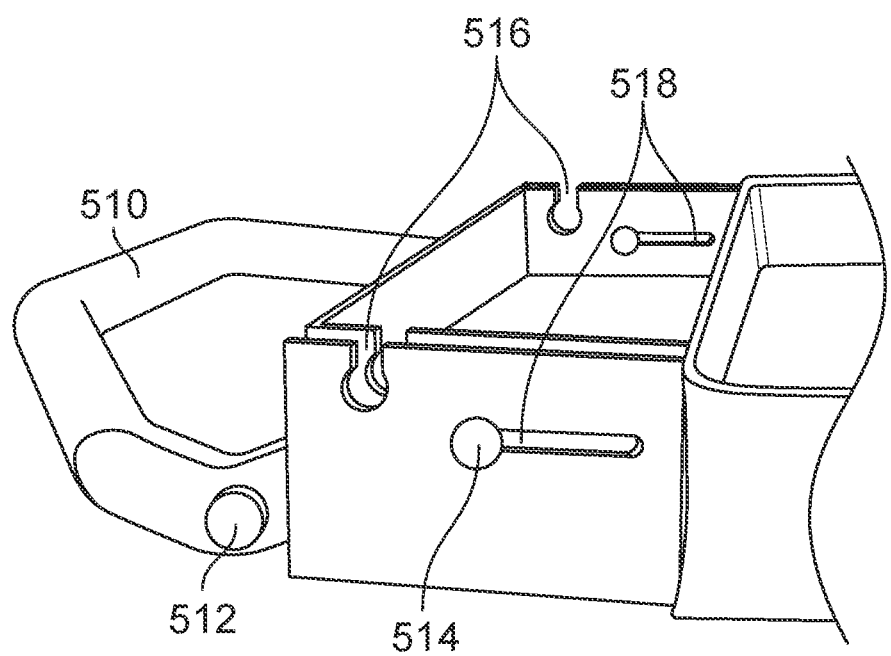
FIG. 6C depicts components of the example utility cart handle of FIG. 6A, in accordance with an embodiment.

Referring again to FIG. 1, in some embodiments, the utility cart 100 also includes a cart handle 110 coupled to the tray 106. In some embodiments, the cart handle 110 could be formed integral with the tray 106 such that the tray 106 and the cart handle 110 are one piece. In other embodiments, the cart handle 110 may be formed as a separate piece from the tray 106 and coupled to the tray 106 in a variety of methods. In some embodiments, the cart handle 110 further includes a recess 112 that, in some examples, may include a spare part bin configured to receive tools or other materials, such as screws, bolts, and the like. In other embodiments, the handle may be moveable, as shown in FIGS. 6A-6C. The tray 106, in some embodiments, further includes one or more grooves 114 configured to receive elongated raw materials, such as rods, beams, or the like, to balance across a top of the tray 106.

The utility cart 100 also includes a plurality of wheels 116 coupled to or secured to a bottom of the base 102. In some embodiments, the plurality of wheels 116 includes a pair of main wheels and a pair of castor wheels. In some embodiments, the plurality of wheels may be mounted in a fender under the base 102 of the utility cart, which would be designed to at least partially protect the plurality of wheels 116. In other embodiments, the plurality of wheels 116 may comprise protruding pneumatic wheels. In some embodiments, the utility cart 100 is additionally equipped with electromechanical gears. In some examples, the main wheels of the utility cart 100 may be powered and driven by electric motors. In operation, a battery and processor unit within the utility cart 100 may be configured to provide power and the logic to operate any necessary electric motors.

In some embodiments, the utility cart 100 further includes three additional panels 108b, 108c, and 108d forming the sides of the cart. In some embodiments, each of the panels are constructed the same as the first panel 108a described above. For example, a second side panel 108b positioned between the base 102, the tray 106, the second support post 104b, and the third support post 104c, a third side panel 108c positioned between the base 102, the tray 106, the third support post 104c, and the fourth support post 104d, and a fourth side panel 108d positioned between the base 102, the tray 106, the fourth support post 104d, and the first support post 104a. In some embodiments, the second side panel 108b also includes a first flange positioned on a lower portion of the second side panel 108b configured to be press-fit into a portion of the first channel 122 of the base 102 between the second mounting location 118b and the third mounting location 118c, along the second side 102b of the base 102. The second side panel further includes a second flange positioned on an upper portion of the second side panel 108b configured to be press-fit into a portion of the second channel 124 of the tray 106 between the second mounting location 120b and the third mounting location 120c. In some embodiments, the third side panel 108c also includes a first flange positioned on a lower portion of the third side panel 108c configured to be press-fit into a portion of the first channel 122 of the base 102 between the third mounting location 118c and the fourth mounting location 118d, along the third side 102c of the base 102. The third side panel 108c further includes a second flange positioned on an upper portion of the third side panel 108c configured to be press-fit into a portion of the second channel 124 of the tray 106 between the third mounting location 120c and the fourth mounting location 120d. In some embodiments, the fourth side panel 108d also includes a first flange positioned on a lower portion of the fourth side panel 108d configured to be press-fit into a portion of the first channel 122 of the base 102 between the fourth mounting location 118d and the first mounting location 118a, along the fourth side 102d of the base 102. The fourth side panel 108d further includes a second flange positioned on an upper portion of the fourth side panel 108d configured to be press-fit into a portion of the second channel 124 of the tray 106 between the fourth mounting location 120d and the first mounting location 120a.

Further, in some embodiments, the second side panel 108b comprises a first arm positioned on a first side of the second side panel 108b configured to be inserted into the first sleeve 130 extending along the first length of the second support post 104b and a second arm positioned on a second side of the second side panel 108b configured to be inserted into the second sleeve 136 extending along the second length of the third support post 104c. As such, the second side panel 108b extends between the second support post 104b and the third support post 104c. In some embodiments, the third side panel 108c comprises a first arm positioned on a first side of the third side panel 108c configured to be inserted into the first sleeve 134 extending along the first length of the third support post 104c and a second arm positioned on a second side of the third side panel 108c configured to be inserted into the second sleeve 140 extending along the second length of the fourth support post 104d. As such, the third side panel 108c extends between the third support post 104c and the fourth support post 104d. In some embodiments, the fourth side panel 108d comprises a first arm positioned on a first side of the fourth side panel 108d configured to be inserted into the first sleeve 138 extending along the first length of the fourth support post 104d and a second arm positioned on a second side of the fourth side panel 108d configured to be inserted into the second sleeve 128 extending along the second length of the first support post 104a. As such, the fourth side panel 108d extends between the fourth support post 104d and the first support post 104a.

In some embodiments, the side panels are attached between neighboring support posts in a variety of ways, as is depicted in FIGS. 3A-3D. For instance, some embodiments of attaching the side panels to respective support posts include a variety of mechanisms for secure attachment between the plurality of support posts and the plurality of side panels. In some embodiments, the plurality of support posts comprise a metallic material, including materials such as steel, stainless steel, aluminum, chromium, titanium, tungsten, or the like. In other embodiments, the plurality of support posts comprise a plastic material, including materials such as acrylic, polymethyl methacrylate, polycarbonate, polypropylene, polyethylene terephthalate, polyvinyl chloride, acrylonitrile-butadiene-styrene, or the like. As such, the method of attaching the side panels between the plurality of support posts can vary. Any method of attaching the side panels to the respective support posts can be used in combination with any components on the utility cart examples described herein.

Figure 3A:
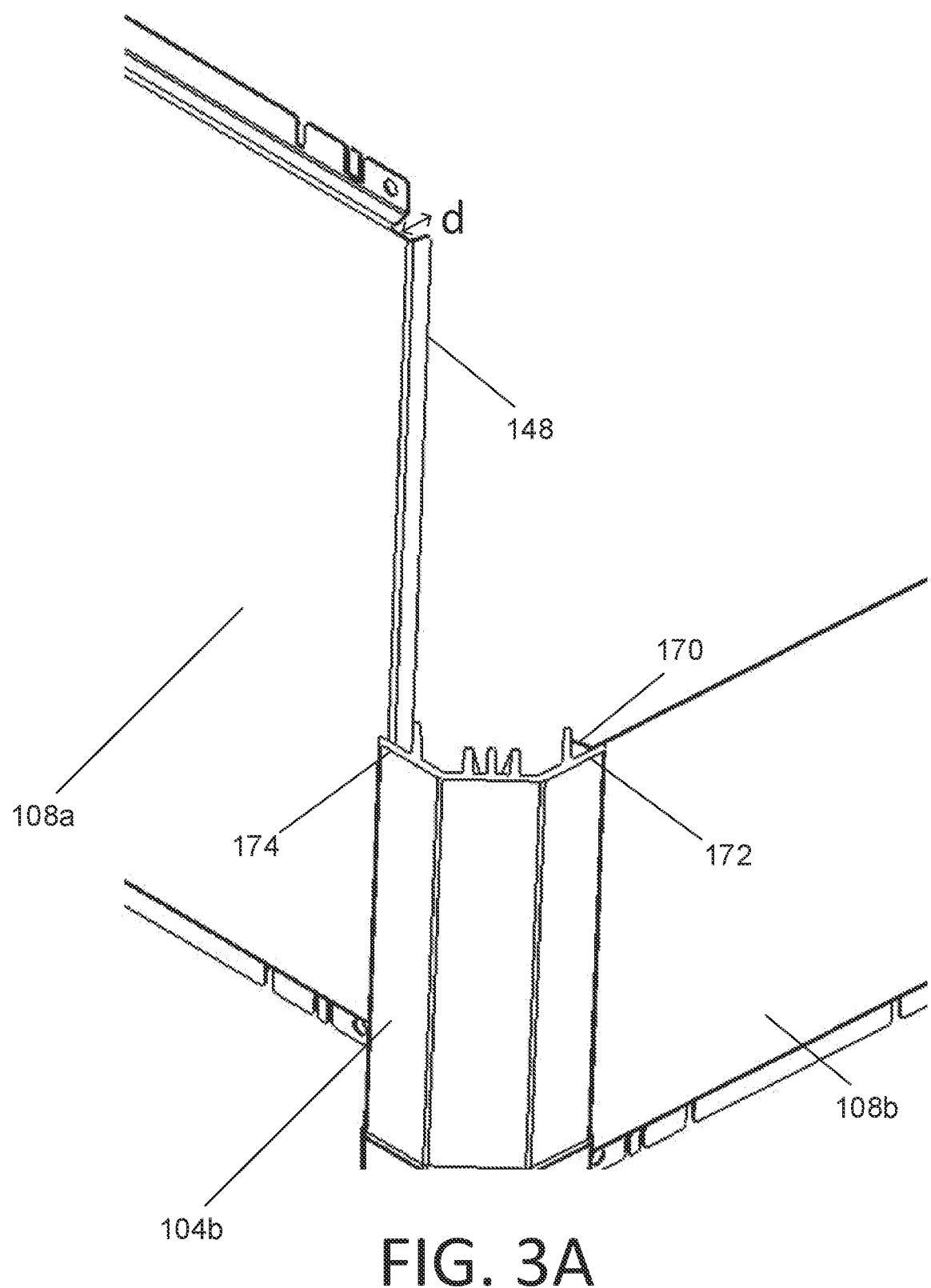
FIG. 3A depicts an example interaction between a side panel and a support post of an example utility cart, in accordance with various embodiments.

As depicted in FIG. 3A, example attaching components for first side panel 108a and second side panel 108b to the second support post 104b are shown. The first support post 104b is shown, having a first sleeve 172 and a second sleeve 174 along opposing lengths of the second support post 104b. In some embodiments, the first sleeve 172 and the second sleeve 174 are each formed as a v-shaped receiving slot. Further, the second sleeve 174 is configured to receive the second arm 148 of the first side panel 108a and the first sleeve 172 is configured to receive a first arm 170 of the second side panel 108b. The second arm 148 is shaped as a bent edge such that it fills the second sleeve 174 and holds the first side panel 108a firmly against the second support post 104b. The second arm 148 is configured to be press-fit into the v-shaped second sleeve 174 to create a secure connection between the first side panel 108a and the second support post 104b. The first arm 170 is shaped as a bent edge such that it fills the first sleeve 172 and holds the second side panel 108b firmly against the support post 104b. The first arm 170 is configured to be press-fit into the v-shaped first sleeve 172 to create a secure connection between the second side panel 108b and the second support post 104b.

It should be understood that other shapes of the above embodiment are possible, such as an L-shaped channel configured to receive an L-shaped arm attached to the first side panel 108a. Other shapes of the arm and related sleeve are also possible. In some embodiments, the arm may be a "key" configured to slide into the sleeve "keyslot" of the support post.

Further, in another embodiment, the support post 104b includes an arm or protrusion that is received by a channel in the side panels. In this embodiment, the shapes of the channels and protrusions/arms may be v-shaped, L-shaped, or may take any other suitable shape.

In each of the embodiments described above, the side panels and support posts interlock via a press-fit or friction fit type fastening mechanism. In other embodiments, such as those described with reference to FIGS. 3B-3D, other types of fastening mechanisms may be used to connect the side panels to each of the support posts.

Figure 3B:
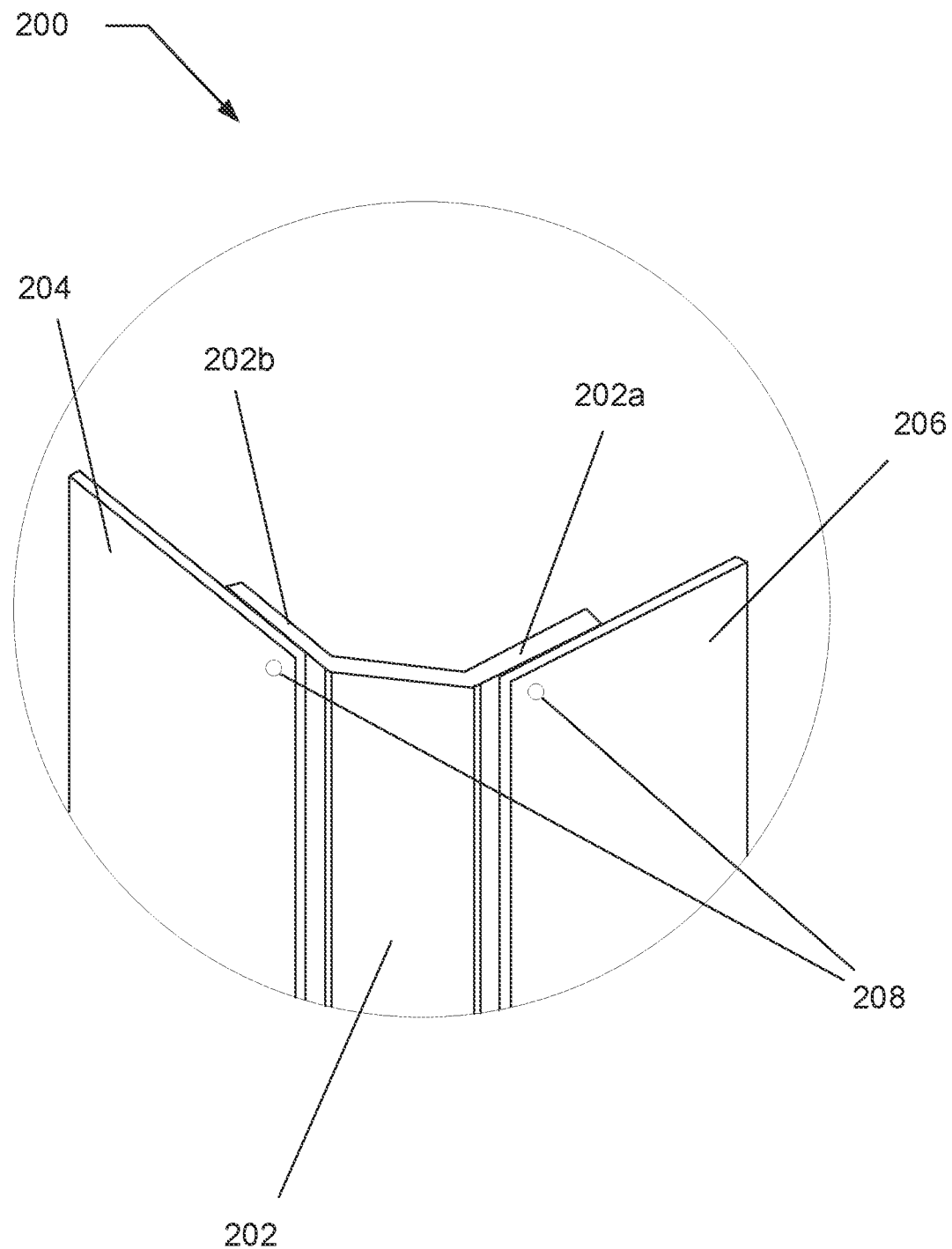
FIG. 3B depicts an example interaction between a side panel and a support post of an example utility cart, in accordance with various embodiments.

Other embodiments of components on the utility cart, such as embodiment 200 shown in FIG. 3B include additional components, such as attaching components like fastening mechanisms 208, to secure side panels 204 and 206, respectively, to the connecting support post 202. For instance, support post 202 may include a first projection 202a and a second projection 202b such that a respective projection of the support post 202 may be secured to a panel of the plurality of panels via a plurality of fastening mechanisms 208. The fastening mechanisms 208 may include any known fastening mechanism, such as bolts, screws, plates, rivets, etc. For instance, the fastening mechanisms 208 depicted here are rivets that may be used to securely attach the first side panel 204 and the second side panel 206 to respective protrusions, 202b and 202a, respectively, of the support post 202, and might be an effective method of attachment if both the side panels 204 and 206 and the support post 202 are made of a metallic material. As such, a first side panel 204 may be coupled to the second projection of the support post 202b by one or more of the fastening mechanisms 208 and a second side panel 206 may be coupled to a first projection 202a of the support post 202 on an example utility cart 200 by one or more of the fastening mechanisms 208.

Figure 3C:
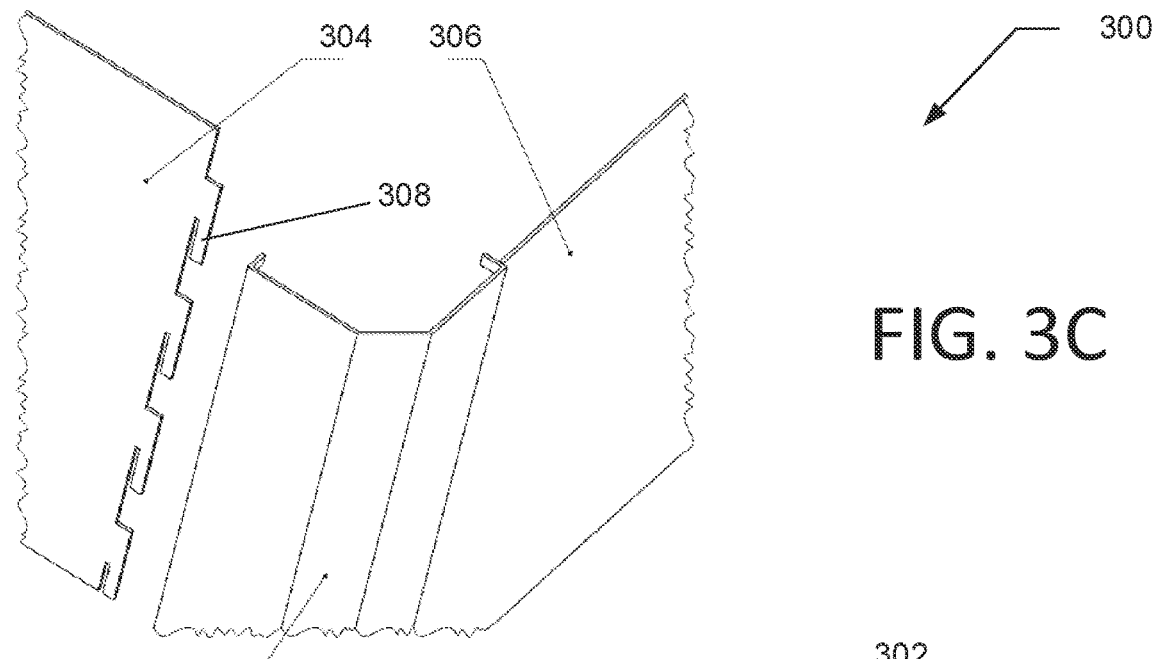
FIG. 3C depicts an example interaction between a side panel and a support post of an example utility cart, in accordance with various embodiments.
Figure 3D:
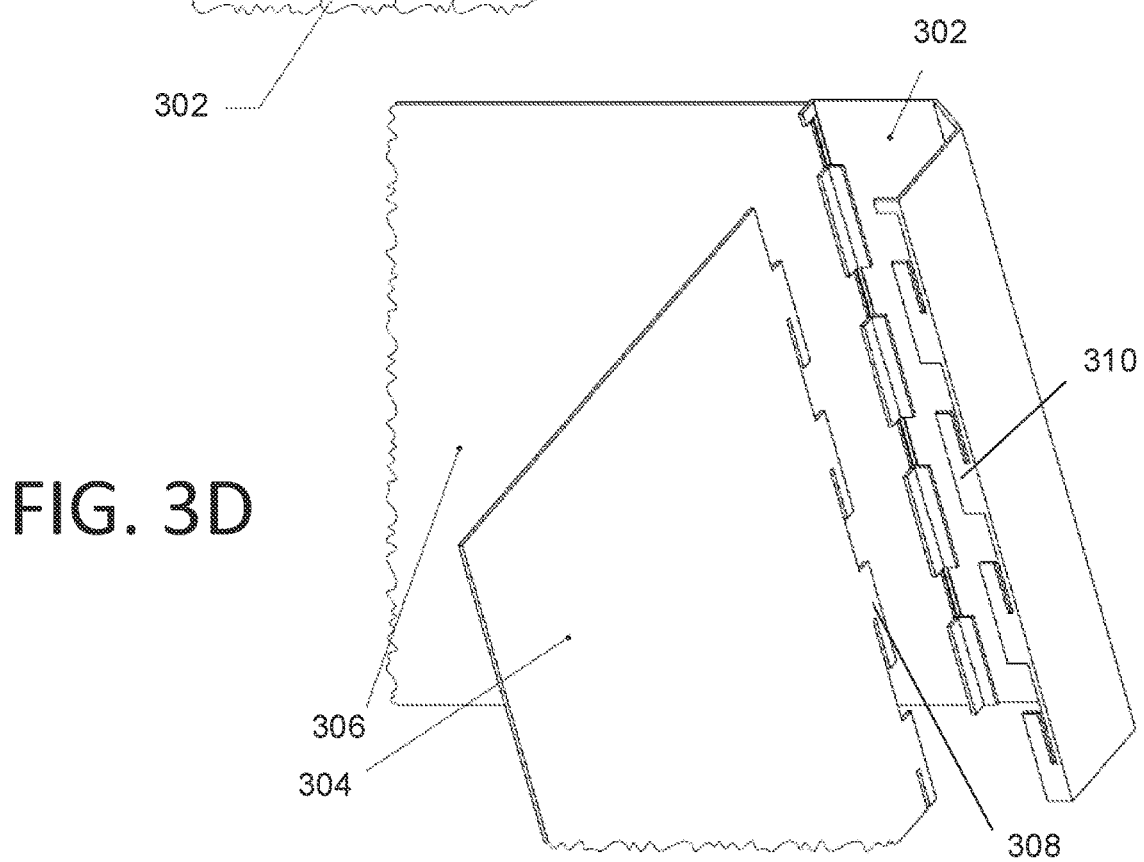
FIG. 3D depicts an example interaction between a side panel and a support post of an example utility cart, in accordance with various embodiments.

As depicted in FIGS. 3C-3D, an additional embodiment of components on utility tool cart 300 are depicted. A support post 302 having a first plurality of fingers 310 along a length of a second side of the support post 302 may be secured to a first side panel 304 having a second plurality of fingers 308. The first plurality of fingers 310 are configured to interlock with the second plurality of fingers 308 to secure the first side panel 304 to the support post 302. The plurality of fingers may be a notch, a slot, a slit, a slat, a hook, or the like. In such embodiments, the first plurality of fingers 310 on the support post 302 couple with the second plurality of fingers 308 on an edge of the first side panel 304 by sliding the side panel 304 downwards along the support post 302 to engage the first plurality of fingers 310 on the support post 302 with the first plurality of fingers 308. In an example embodiment, each support post includes a first set of fingers 310 and a third set of fingers such that the first side panel 304 is coupled to the first set of fingers 310 of the first support post 302 by the second set of fingers 308 on an edge of the first side panel 304 and the second side panel 306 is coupled to the third set of fingers of the first support post 302 by a fourth set of fingers on an edge of the second side panel 306. Other coupling mechanisms are also possible.

Figure 4A:
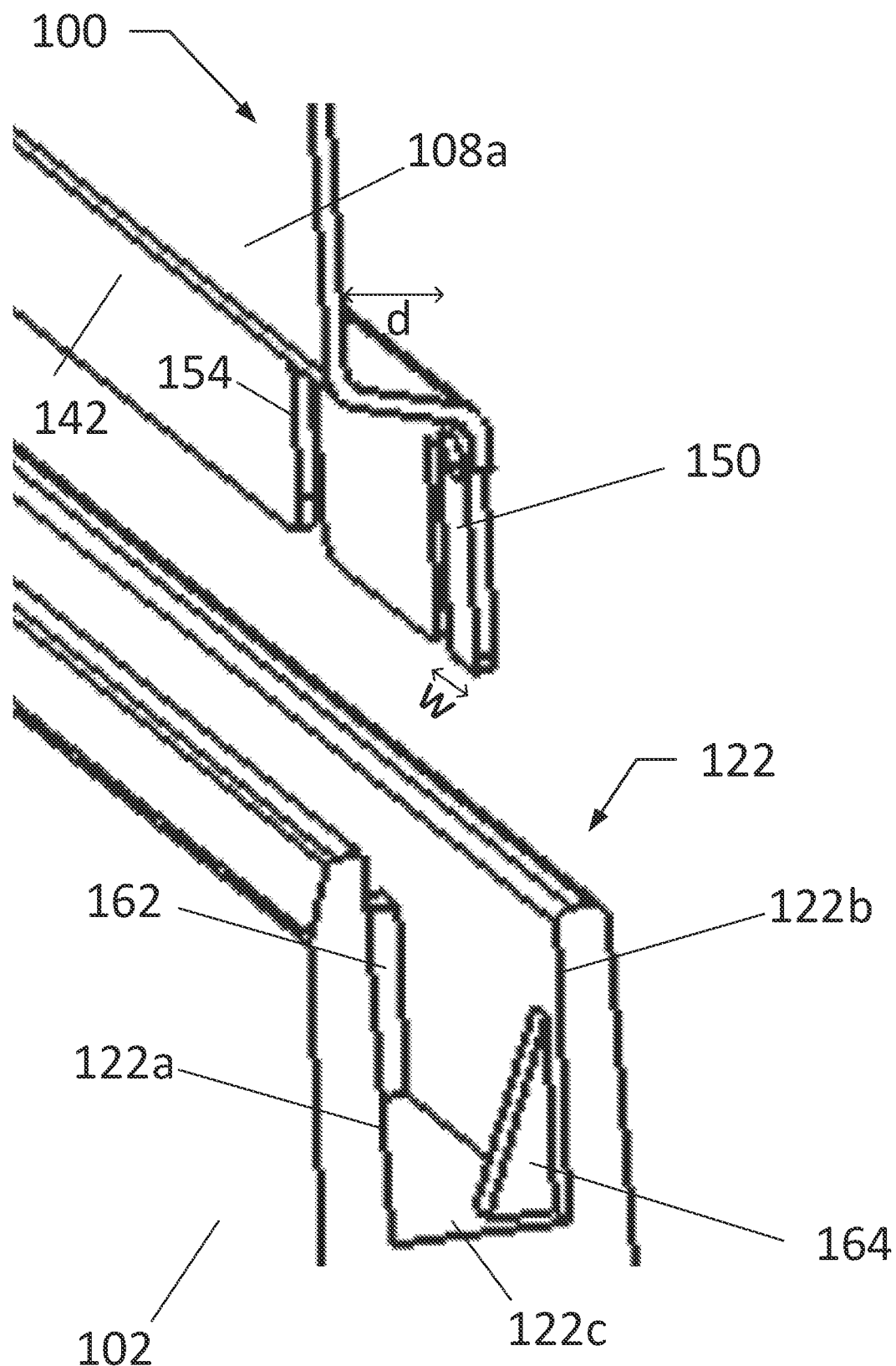
FIG. 4A depicts a close up view of an example panel and channel on an example utility cart, in accordance with an embodiment.
Figure 4B:
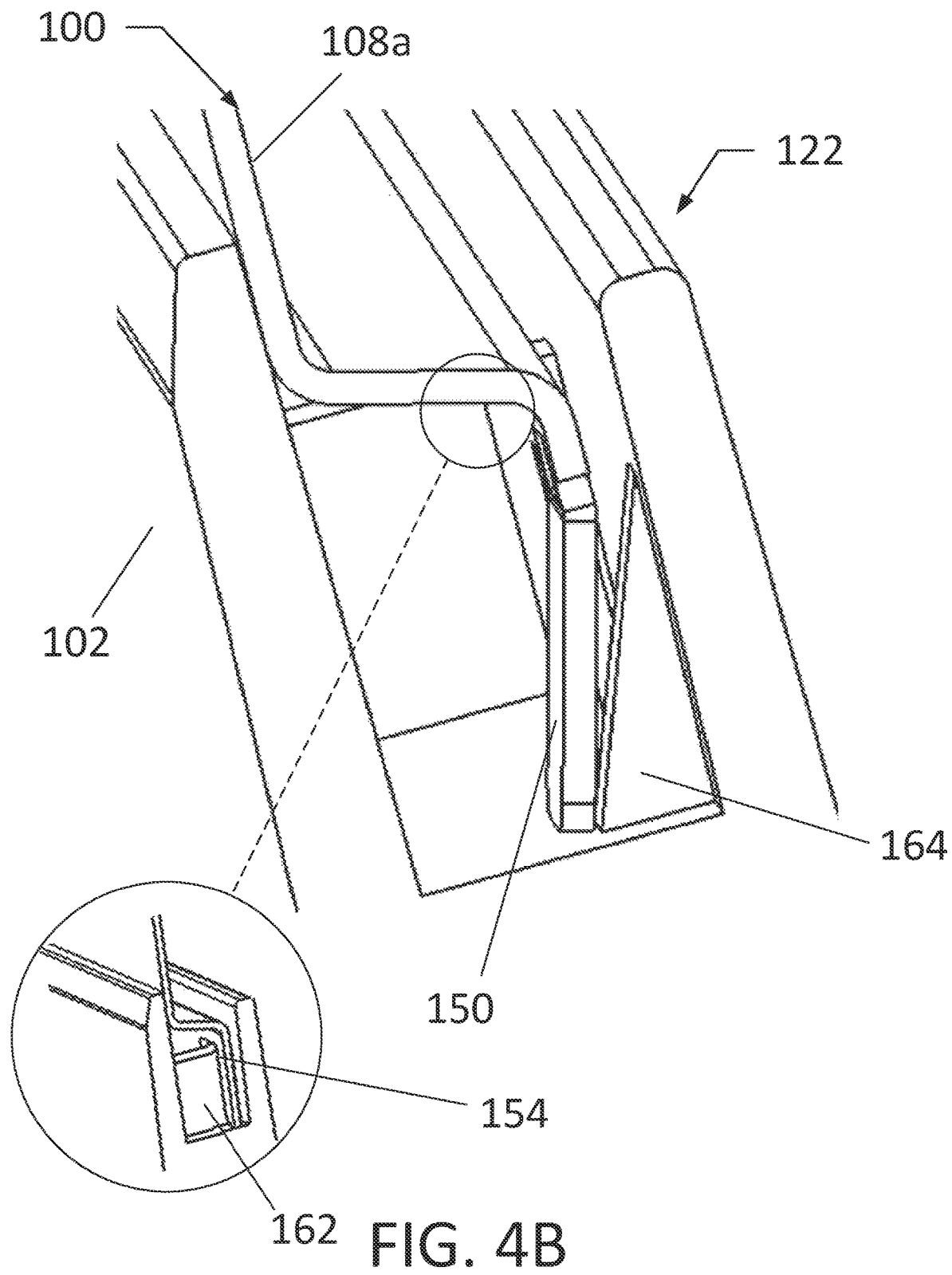
FIG. 4B depicts a close up view of an example interaction between an example panel and channel on an example utility cart, in accordance with an embodiment.

As depicted in FIGS. 4A-4B, the side panel 108a includes the lower flange 142 and upper flange 144 (shown in FIG. 2D). The lower flange 142 may be configured to be received by the first channel 122 of the base 102 of the utility cart 100. The upper flange 144 may be configured to be received by the second channel 124 of the tray 106.

Further, in the lower flange 142 of the side panel 108a, the at least one anti-vibration tab 150 is bendable from a parallel position with the lower flange 142 such that the at least one anti-vibration tab 150 is configured to bias the side panel 108a against a wedge 164 extending from the inner edge 122b of the first channel 122 by biasing the anti-vibration tab 150 against the wedge 164 so that the side panel 108a does not rattle or vibrate between the inner edge 122b and the outer edge 122a of the first channel 122 of the base 108a. In some embodiments, the anti-vibration tab 150 has a width w that allows the anti-vibration tab 150 to be installed against wedge 164 in the first channel 122 without abundant effort while still maintaining its structure to reduce vibration between the side panel 108a and the first channel 122, as shown in FIG. 4B. In some embodiments, the width of the anti-vibration tab 150 is between 0.3 inches and 0.5 inches wide. Similarly, in the upper flange of the side panel 108a, an at least one anti-vibration tab is bendable from a parallel position with the upper flange such that the at least one anti-vibration tab is configured to bias the side panel 108a by biasing the anti-vibration tab against the wedge so that the side panel 108a does not rattle between the inner edge and the outer edge of the second channel of the tray. These anti-vibration tabs may be used in conjunction with any other component described herein.

As described above, the first channel 122 along the base 102 of the utility cart 100 further includes a first plurality of ribs configured to couple with a first plurality of notches along a length of a lower flange 142 of the side panel 108a. For example, notch 154 in lower flange 142 is configured to couple with rib 5162 in the first channel 122 of the base 102 when the side panel 108a is inserted into the first channel 122. Any other components described above are also able to be included in utility cart 100.

Figure 5:
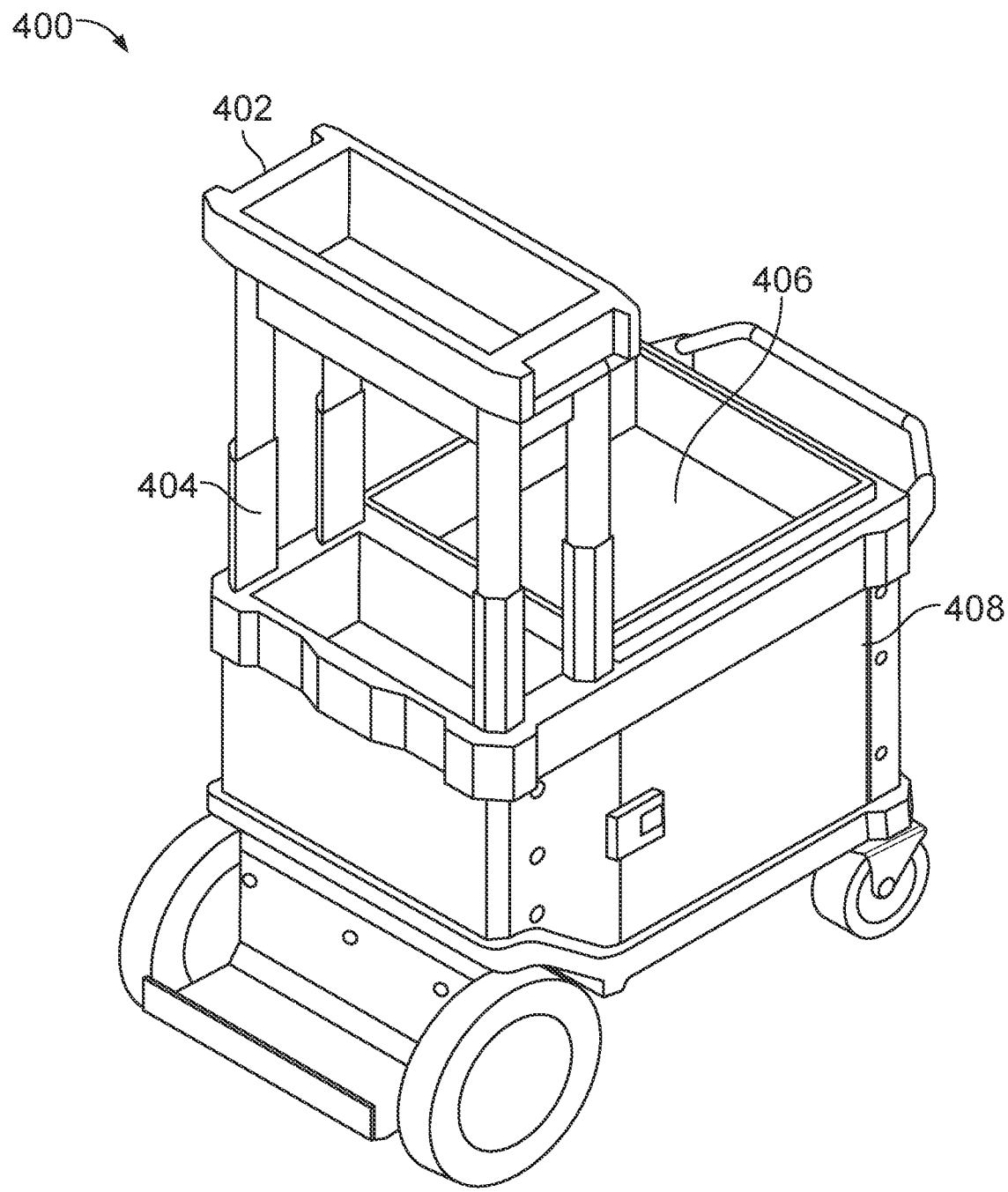
FIG. 5 depicts a perspective view of an example utility cart, in accordance with another embodiment.

Referring to FIG. 5, an alternate embodiment of a utility cart 400 is shown. Utility cart 400 may include an auxiliary tray 402 that may be movably attached, and may be removable, via at least one strut 404 to a main tray 406 of a body 408 of the utility cart 400. In differing embodiments, the at least one strut 404 may be a singular strut, a pair of struts, or a plurality of struts. In some embodiments, a planning table/work surface may be configured to fit atop the main tray 406 such that a user may use the flat surface of the planning table/work surface, or such that the planning table/ work surface encloses and/or prevents exposure of contents within the main tray 406. In some embodiments, an at least one latch lever may be attached to the auxiliary tray 402 on one or more sides. In other embodiments, the at least one latch lever may be attached to the auxiliary tray 402 on a back side of the auxiliary tray. The at least one latch lever allows the user to adjust the auxiliary tray 402 via the at least one strut 404 vertically upward and downward to a convenient height depending on the intended use of the auxiliary tray 402. In some examples, the auxiliary tray 402 may be configured to be raised or lowered in set increments. For instance, the auxiliary tray 402 may be configured to be raised in 10 inch increments up to 60 inches off of the ground, or adding 30 inches to the top of the example utility cart 400. Other dimensions and increments have been contemplated and are possible. In some examples, the auxiliary tray 402 may be raised and lowered by an electric tray motor.

FIGS. 6A-6C depict another embodiment of a utility cart 500 with a base 502, an upper tray 504, and a lower tray 506. The utility cart 500 may include any of the components depicted in FIGS. 1-5. For instance, in some embodiments, the utility cart 500 includes a set of wheels 508.

The utility cart 500 further includes a moveable handle 510. In some embodiments, the handle 510 has two positions in relation to the utility cart: engaged and disengaged. In the engaged position, the handle 510 maybe at a convenient height in order to allow a user to conveniently push or pull the utility cart 500. However, in the disengaged position, the handle 510 may be lowered to allow for an object to be placed atop the utility cart 500 that are oversized and extend beyond the edges of the utility cart 500. For example, in some embodiments, the base 502 of the utility cart 500 may include notches 516 and slots 518 such that the notches 516 may be designed to allow stoppers 512 of the handle 510 to rest therein when in the engaged position. To move from the engaged position to the disengaged position, the handle 510 is lifted such that the stoppers 512 are cleared from the notches 516, sliding components 514 coupled to the handle 510 slide away from the base 502 of the utility cart 500 through the slots 518, and the handle 510 is lowered to the disengaged position. To move from the disengaged position back to the engaged position, the handle 510 is raised, the sliding components 514 coupled to the handle 510 slide toward the base 502 of the utility cart 500 through the slots 518, and the handle 510 is lowered until the stoppers 512 engage the notches 516.

Further, in some examples, the cart handle 510 could be configured to be in a pulling position such that a user pulls the cart from the handle in this orientation. However, if the cart handle is removed and recoupled to an opposing side of the upper tray 504 of the utility cart 500, the cart may be utilized in a pushing fashion.

In some examples, the utility cart may further include a removable ladder ledge such that a ladder may be received on the ladder ledge. The ladder ledge may be configured to be attached on an opposing side of the body of the utility cart as the cart handle. In some embodiments, an upper edge of the main tray may further include a perforated surface or a rail for attachment thereto of a hook or a carabineer. In some embodiments, a retainer strap may also be coupled to the body of an example utility cart such that a ladder may be coupled to the utility cart when desired. The removable ladder ledge and the retainer strap may be configured to be attached at either end of the example utility cart.

In some examples, an example utility cart may further be configured to work with a user-worn, small signaling device that is electronically connected to at least one motor on the utility cart, as well as electronically coupled to a receiver in the auxiliary tray. In such scenarios, a wheel drive motors may be connected to the utility cart and, when operating in "follow mode," as a user moves with the worn small signaling device throughout a workspace environment, the utility cart may automatically follow the user based on received information at the wheel drive motors. Further, in some embodiments, the auxiliary tray on the utility cart may automatically rise or lower via the tray motor in response to the user moving upwards or downwards with the small signaling device, such as climbing a ladder, when operating in "climbing" mode. In some embodiments, a third "assist" mode may exist such that, when the user pushing on the cart handle activates the wheel drive motors, the wheel drive motors help the user to move a heavily loaded utility cart over rough terrain.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A utility cart comprising:
  a base having a first side, a second side, a third side, and a fourth side, and a first channel extending along each of the first side, the second side, the third side, and the fourth side;
  a first support post extending upwardly from the base between the fourth side and the first side, a second support post extending upwardly from the base between the first side and the second side, a third support post extending upwardly from the base between the second side and the third side, and a fourth support post extending upwardly from the base between the third side and the fourth side, wherein each of the first, second, third, and fourth support posts have a first end and a second end;
  a tray attached to the second end of each of the support posts, wherein the tray comprises a second channel opening downwards from the tray;
  a first side panel positioned between the base, the tray, the first support post, and the second support post, wherein:
    the first side panel comprises a first flange positioned on a lower portion of the first side panel, the first flange configured to be press-fit into the first channel of the base, and the first side panel further comprises a second flange positioned on an upper portion of the first side panel, the second flange configured to be press-fit into the second channel of the tray;
    the first side panel comprises a first arm positioned on a first side of the first side panel, the first arm configured to be inserted into a first sleeve extending along a first length of the first support post; and
    the first side panel comprises a second arm on a second side of the first side panel configured to be inserted into a second sleeve extending along a second length of the second support post;
  a cart handle coupled to the tray; and
  a plurality of wheels secured to a bottom of the base.

2. The utility cart of claim 1, wherein the first side panel further comprises a first s-shaped bend between a wall portion of the first side panel and the first flange, and wherein the first side panel further comprises a second s-shaped bend between the wall portion of the first side panel and the second flange.

3. The utility cart of claim 1, further comprising:
a second side panel positioned between the base, the tray, the second support post, and the third support post, a third side panel positioned between the base, the tray, the third support post, and the fourth support post, and a fourth side panel positioned between the base, the tray, the fourth support post, and the first support post, and
a first flange is positioned on a lower portion of each of the second, third, and fourth side panels configured to be press-fit into the first channel of the base, and a second flange positioned on an upper portion of each of the second, third, and fourth side panels configured to be press-fit into the second channel of the tray.

4. The utility cart of claim 3, wherein:
the second side panel comprises a first arm positioned on a first side of the second side panel configured to be inserted into a first sleeve extending along a first length of the second support post, and a second arm positioned on a second side of the second side panel configured to be inserted into a second sleeve extending along a second length of the third support post;
the third side panel comprises a first arm positioned on a first side of the third side panel configured to be inserted into a first sleeve extending along a first length of the third support post, and a second arm positioned on a second side of the third side panel configured to be inserted into a second sleeve extending along a second length of the fourth support post; and
the fourth side panel comprises a first arm positioned on a first side of the fourth side panel configured to be inserted into a first sleeve extending along a first length of the fourth support post, and a second arm positioned on a second side of the fourth side panel configured to be inserted into a second sleeve extending along a second length of the first support post.

5. The utility cart of claim 1, wherein the first side panel further comprises a shoulder in each corner of the first side panel such that the first side panel is configured to be installed in a plurality of orientations.

6. The utility cart of claim 1, wherein the first side panel further comprises at least one door.

7. The utility cart of claim 6, wherein the at least one door further includes a locking mechanism.

8. The utility cart of claim 1, wherein the tray further comprises a plurality of grooves.

9. The utility cart of claim 1, wherein the first flange further includes a first anti-vibration tab configured to bias the first side panel against a first wedge of an inner edge of the first channel, and wherein the second flange further includes a second anti-vibration tab configured to bias the first side panel against a second wedge of an inner edge of the second channel.

10. The utility cart of claim 1, wherein the first flange further includes a first plurality of notches such that the first plurality of notches are configured to align with a first plurality of ribs in the first channel of the base, and wherein the second flange further includes a second plurality of notches such that the second plurality of notches are configured to align with a second plurality of ribs in the second channel of the tray.

11. A utility cart comprising:
a base having a first side, a second side, a third side, and a fourth side, and a first channel extending along each of the first side, the second side, the third side and the fourth side;
a first support post extending upwardly from the base between the fourth side and the first side, a second support post extending upwardly from the base between the first side and the second side, a third support post extending upwardly from the base between the second side and the third side, and a fourth support post extending upwardly from the base between the third side and the fourth side, wherein each of the first, second, third, and fourth support posts have a first end and a second end;
a tray attached to the second end of each of the support posts, wherein the tray comprises a second channel opening downwards from the tray;
a first side panel positioned between the base, the tray, the first support post, and the second support post, wherein:
the first side panel comprises a first flange on a lower portion of the first side panel configured to be coupled with the first channel of the base and a second flange on an upper portion of the first side panel configured to be coupled with the second channel of the tray, wherein:
the first flange includes a first anti-vibration tab configured to bias the first side panel against a first wedge of an inner edge of the first channel; and
the second flange includes a second anti-vibration tab configured to bias the first side panel against a second wedge of an inner edge of the second channel;
a cart handle coupled to the tray; and
a plurality of wheels secured to a bottom of the base.

12. The utility cart of claim 11, wherein each support post comprises a first projection and a second projection, and wherein the first side panel is coupled to the second projection of the first support post by a first plurality of rivets, and wherein the first side panel is coupled to the first projection of the second support post by a second plurality of rivets.

13. The utility cart of claim 11, wherein each support post comprises a first protrusion and a second protrusion, and wherein:
the first side panel is coupled to the second protrusion of the first support post by a first coupling interface on a first edge of the first side panel,
the first side panel is coupled to the first protrusion of the second support post by a second coupling interface on a second edge of the first side panel, and
the first coupling interface is configured to fit over the second protrusion of the first support post and the second coupling interface is configured to fit over the first protrusion of the second support post.

14. The utility cart of claim 11, wherein each support post comprises a first set of fingers and a second set of fingers, and wherein:
the first side panel is coupled to the second set of fingers of the first support post by a third set of fingers on a first edge of the first side panel,
the first side panel is coupled to the first set of fingers of the second support post by a fourth set of fingers on a second edge of the first side panel, and
the third set of fingers are configured to intertwine with the second set of fingers and the fourth set of fingers are configured to intertwine with the first set of fingers.

15. The utility cart of claim 11, wherein the first flange further includes a first plurality of notches such that the first plurality of notches are configured to align with a first plurality of ribs in the first channel of the base, and wherein the second flange further includes a second plurality of notches such that the second plurality of notches are configured to align with a second plurality of ribs in the second channel of the tray.

16. A utility cart comprising:
a base having a first side, a second side, a third side, and a fourth side, and a first channel extending along each of the first side, the second side, the third side and the fourth side;
a first support post extending upwardly from the base between the fourth side and the first side, a second support post extending upwardly from the base between the first side and the second side, a third support post extending upwardly from the base between the second side and the third side, and a fourth support post extending upwardly from the base between the third side and the fourth side, wherein each of the first, second, third, and fourth support posts have a first end and a second end;
a tray attached to the second end of each of the support posts, wherein the tray comprises a second channel opening downwards from the tray;
a first side panel positioned between the base, the tray, the first support post, and the second support post, wherein:
the first side panel comprises a first flange on a lower portion of the first side panel configured to be coupled with the first channel of the base and a second flange on an upper portion of the first side panel configured to be coupled with the second channel of the tray, wherein:
the first flange includes a first plurality of notches such that the first plurality of notches are configured to align with a first plurality of ribs in the first channel of the base; and
the second flange includes a second plurality of notches such that the second plurality of notches are configured to align with a second plurality of ribs in the second channel of the tray;
a cart handle coupled to the tray; and
a plurality of wheels secured to a bottom of the base.

17. The utility cart of claim 16, wherein:
the first flange is configured to be press-fit into the first channel of the base and the first flange includes a first anti-vibration tab configured to bias the first side panel against a first wedge of an inner edge of the first channel;
the second flange is configured to be press-fit into the second channel of the tray and the second flange includes a second anti-vibration tab configured to bias the first side panel against a second wedge of an inner edge of the second channel;
the first side panel further comprises a first arm positioned on a first side of the first side panel, the first arm configured to be inserted into a first sleeve extending along a first length of the first support post; and
the first side panel further comprises a second arm on a second side of the first side panel configured to be inserted into a second sleeve extending along a second length of the second support post.

18. The utility cart of claim 16, wherein each support post comprises a first protrusion and a second protrusion, and wherein:
the first side panel is coupled to the second protrusion of the first support post by a first coupling interface on a first edge of the first side panel,
the first side panel is coupled to the first protrusion of the second support post by a second coupling interface on a second edge of the first side panel, and
the first coupling interface is configured to fit over the second protrusion of the first support post and the second coupling interface is configured to fit over the first protrusion of the second support post.

19. The utility cart of claim 16, wherein each support post comprises a first set of fingers and a second set of fingers, and wherein:
the first side panel is coupled to the second set of fingers of the first support post by a third set of fingers on a first edge of the first side panel,
the first side panel is coupled to the first set of fingers of the second support post by a fourth set of fingers on a second edge of the first side panel, and
the third set of fingers are configured to intertwine with the second set of fingers and the fourth set of fingers are configured to intertwine with the first set of fingers.

20. The utility cart of claim 16, wherein the first side panel further comprises a first s-shaped bend between a wall portion of the first side panel and the first flange, and wherein the first side panel further comprises a second s-shaped bend between the wall portion of the first side panel and the second flange.

* * * * *